(12) United States Patent
Kitamura et al.

(10) Patent No.: US 11,614,661 B2
(45) Date of Patent: Mar. 28, 2023

(54) DISPLAY DEVICE

(71) Applicant: Japan Display Inc., Tokyo (JP)

(72) Inventors: Koji Kitamura, Tokyo (JP); Yoshihide Ohue, Tokyo (JP); Kentaro Okuyama, Tokyo (JP); Hiroya Morimoto, Tokyo (JP); Masato Kesho, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 17/656,475

(22) Filed: Mar. 25, 2022

(65) Prior Publication Data

US 2022/0317498 A1   Oct. 6, 2022

(30) Foreign Application Priority Data

Mar. 31, 2021   (JP) .............................. JP2021-060765

(51) Int. Cl.
*G02F 1/1339*   (2006.01)
(52) U.S. Cl.
CPC ................. *G02F 1/13394* (2013.01)
(58) Field of Classification Search
CPC ............. G02F 1/133388; G02F 1/1341; G02F 1/13394; G02F 1/13398
See application file for complete search history.

(56) References Cited

U.S. PATENT DOCUMENTS

| 2002/0171800 | A1* | 11/2002 | Miyazaki | ............ | G02F 1/13394 |
| | | | | | 349/156 |
| 2003/0169474 | A1* | 9/2003 | Adachi | ............... | G02F 1/13394 |
| | | | | | 359/245 |
| 2021/0096407 | A1 | 4/2021 | Fukuoka et al. | | |

FOREIGN PATENT DOCUMENTS

JP   2019-219565 A   12/2019

\* cited by examiner

*Primary Examiner* — Angela K Davison
(74) *Attorney, Agent, or Firm* — Maier & Maier, PLLC

(57) ABSTRACT

A display device includes a display region, a peripheral region around the display region, a sealing portion provided in the peripheral region to seal the liquid crystal layer, and a liquid crystal supply portion provided at a part of the sealing portion and interconnecting an outside of the sealing portion and the display region. The liquid crystal supply portion is provided along one side of the peripheral region. The peripheral region includes a first peripheral region located between the display region and the sealing portion. An insulating film is removed in the first peripheral region. In the first peripheral region, a plurality of second spacer members and a plurality of third spacer members to support the plurality of second spacer members are provided.

15 Claims, 7 Drawing Sheets

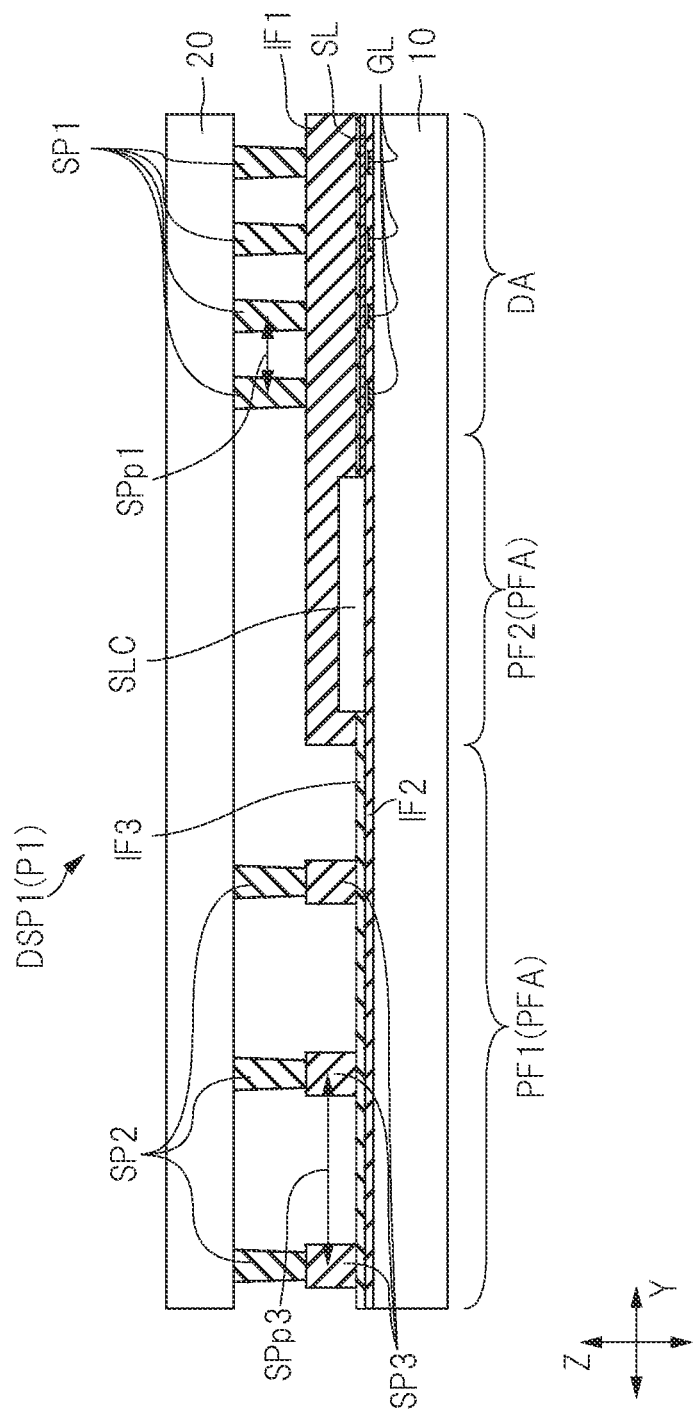

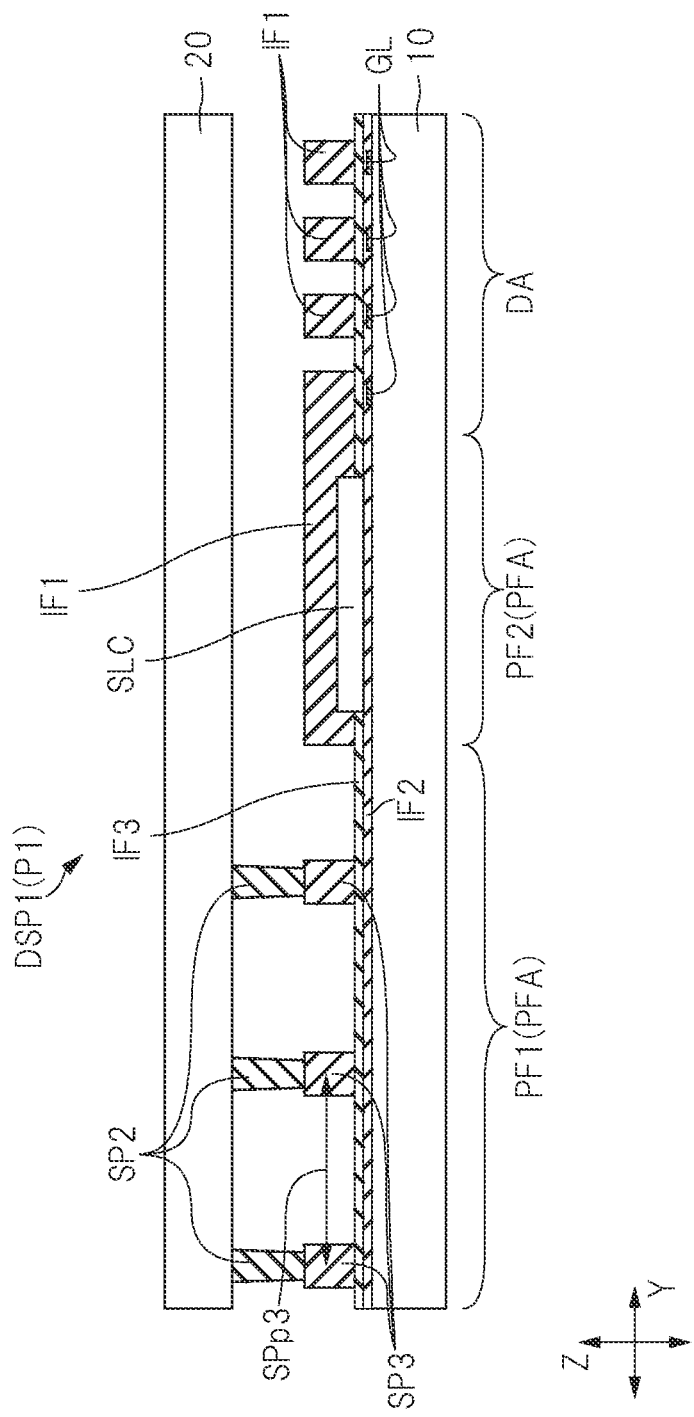

DISPLAY DEVICE

CROSS REFERENCE TO RELATED APPLICATIONS

The present application claims priority to Japanese Patent Application No. 2021-60765 filed on Mar. 31, 2021, the disclosure of which is incorporated herein by reference.

TECHNICAL FIELD OF THE INVENTION

The present invention relates to a display device using a liquid crystal layer.

BACKGROUND OF THE INVENTION

As a method of manufacturing a display device using a liquid crystal layer, a technology of manufacturing a display device in which liquid crystal is enclosed by supplying the liquid crystal between substrates facing each other has been known (see Japanese Unexamined Patent Application Publication No. 2019-219565 (Patent Document 1)).

SUMMARY OF THE INVENTION

In the case of the method of enclosing liquid crystal between substrates by supplying the liquid crystal between the substrates facing each other, an opening used as an inlet port of the liquid crystal is provided at a part of a sealing portion configured to prevent the liquid crystal supplied between the substrates from leaking outside. By bringing the liquid crystal into contact with the opening in a vacuum atmosphere and then returning the pressure around the substrates to an ordinary pressure, the liquid crystal is enclosed into the space surrounded by the sealing portion by the pressure difference between the pressure inside the space surrounded by the sealing portion and the atmospheric pressure.

However, the study by the inventors of the present application has revealed that there is the problem that affects the performance of the display device when the liquid crystal is enclosed by the method mentioned above. For example, if a member that obstructs the flow of the liquid crystal is present in the space surrounded by the sealing portion when the liquid crystal is supplied from the opening mentioned above, a large number of fine bubbles are generated in the liquid crystal in some cases. If these fine bubbles remain, the display performance of the display device will be affected.

An object of the present invention is to provide a technology capable of improving the performance of the display device.

Means for Solving the Problem

The display device according to an aspect of the present invention includes a display region, a peripheral region around the display region, a first substrate, a second substrate facing the first substrate, a liquid crystal layer arranged between the first substrate and the second substrate and containing liquid crystal, a plurality of signal wirings formed on the first substrate and transmitting a drive signal for driving the liquid crystal, a first insulating film arranged between the first substrate and the second substrate and covering the plurality of signal wirings, a plurality of first spacer members arranged between the first insulating film and the second substrate in the display region and maintaining a gap between the first substrate and the second substrate, a sealing portion provided in the peripheral region between the first substrate and the second substrate to seal the liquid crystal layer, and a liquid crystal supply portion provided at a part of the sealing portion and interconnecting an outside of the sealing portion and the display region. In a plan view seen from a side of the second substrate, the peripheral region has a first side, a second side on an opposite side of the first side, a third side intersecting with the first side, and a fourth side on an opposite side of the third side. The liquid crystal supply portion is provided along the first side of the peripheral region. The peripheral region includes a first peripheral region located between the display region and the sealing portion. The first insulating film is removed in the first peripheral region. In the first peripheral region, a plurality of second spacer members arranged between the first substrate and the second substrate and a plurality of third spacer members formed between the plurality of second spacer members and the first substrate to support the plurality of second spacer members are provided.

BRIEF DESCRIPTIONS OF THE DRAWINGS

FIG. 6 is an enlarged cross-sectional view taken along the line C-C in FIG. 5; and FIG. 7 is an enlarged cross-sectional view taken along the line D-D in FIG. 5.

DESCRIPTIONS OF THE PREFERRED EMBODIMENTS

Figure 1:
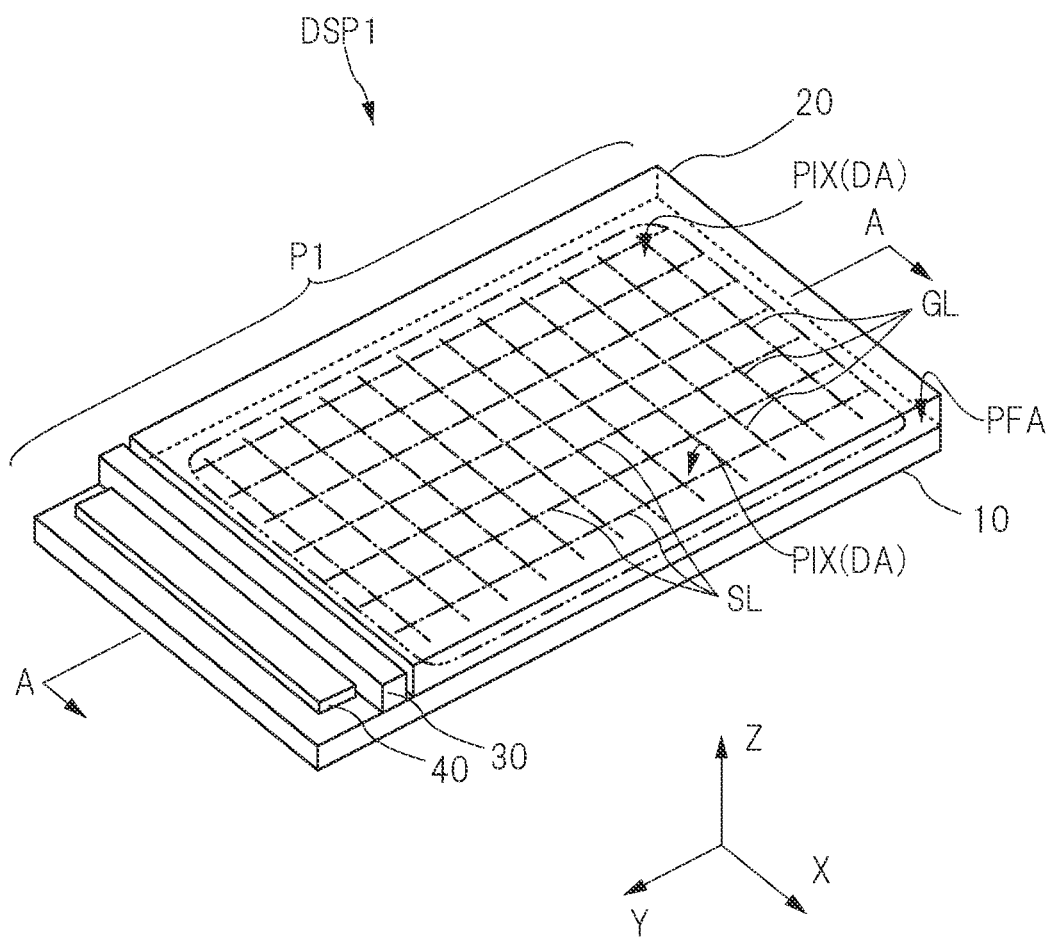
FIG. 1 is a perspective view showing an example of a display device according to an embodiment.

Hereinafter, each embodiment of the present invention will be described with reference to the accompanying drawings. Note that the disclosure is mere an example, and it is a matter of course that any alteration that is easily made by a person skilled in the art while keeping a gist of the present invention is included in the range of the present invention. In addition, the drawings schematically illustrate a width, a thickness, a shape, and the like of each portion as compared to actual aspects in order to make the description clearer, but the drawings are mere examples and do not limit the interpretation of the present invention. Further, the same or related reference characters are applied to the same elements as those described in relation to the foregoing drawings in the present specification and the respective drawings, and detailed descriptions thereof will be appropriately omitted in some cases.

In the following embodiment, a liquid crystal display device configured to display various images in a display region will be described as an example of a display device having a liquid crystal layer.

Also, a liquid crystal display device is a device that forms a display image by changing the orientation of molecules contained in the liquid crystal layer, but requires a light source. In the present embodiment, a display device in which a light source is provided on the side of a display panel including a liquid crystal layer will be described as an example. However, there are various modifications of the embodiment described below, and for example, the technology described below can be applied to a liquid crystal display device in which a light source is arranged on the back side of the display panel.

<Configuration of Display Device>

Figure 2:
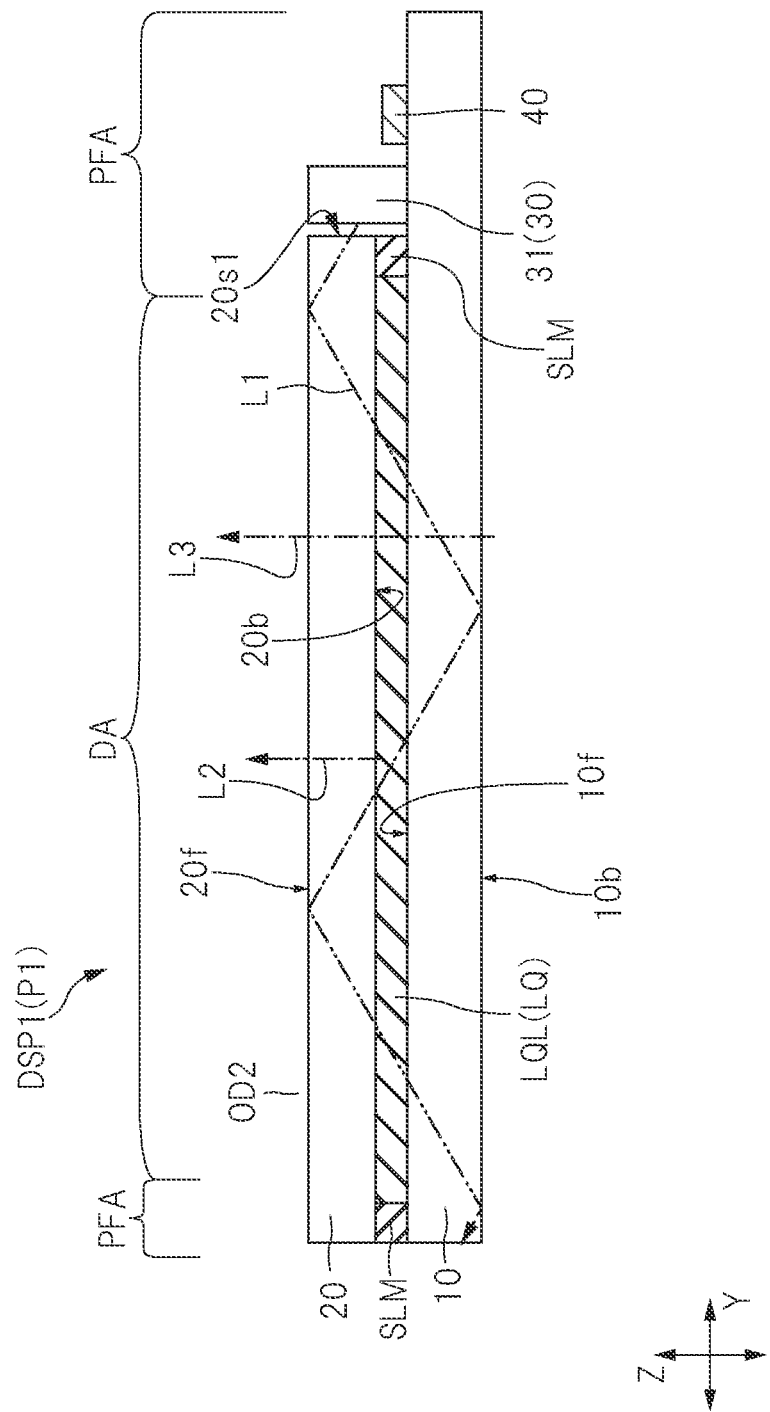
FIG. 2 is a cross-sectional view taken along the line A-A in FIG. 1.

First, a configuration of the display device will be described. FIG. 1 is a perspective view showing an example of the display device according to the present embodiment. In FIG. 1, the boundary between a display region DA and a peripheral region PFA is shown by an alternate long and two short dashes line. Further, in FIG. 1, a part of the signal wiring for transmitting the signal for driving the liquid crystal (specifically, a gate line GL and a source line SL) in the circuit provided in a display device DSP1 is schematically shown by an alternate long and short dash line. In the description with reference to the following drawings including FIG. 1, the direction along the thickness direction of the display device DSP1 is defined as the Z direction, the extending direction of one side of the display panel P1 in the X-Y plane orthogonal to the Z direction is defined as the X direction, and the direction intersecting with the X direction is defined as the Y direction. FIG. 2 is a cross-sectional view taken along the line A-A in FIG. 1.

As shown in FIG. 1, the display device DSP1 of the present embodiment includes a display panel P1 having a substrate (array substrate) 10, a substrate (counter substrate) 20, a side light source device 30, and a drive circuit 40. The display device DSP1 may include, for example, a control circuit, a flexible substrate connected to the display panel P1, a housing, and the like, in addition to the parts provided in the display panel P1 shown in FIG. 1. In FIG. 1, illustration of the parts other than the display panel P1 is omitted. The display device DSP1 has the display region DA in which an image is formed in accordance with an input signal supplied from outside and the peripheral region (frame region) PFA around the display region DA. Although the display region DA of the display device DSP1 shown in FIG. 1 is a quadrangle, the display region may have a shape other than a quadrangle such as a polygon or a circle. The display region DA is an effective region in which the display device DSP1 displays an image on the display surface in a plan view. Each of the substrates 10 and 20 is located at a position overlapping the display region DA in a plan view. Each of the side light source device 30 and the drive circuit 40 is mounted on the substrate 10.

As shown in FIG. 2, the display device DSP1 includes the substrate 10 and the substrate 20 bonded so as to face each other via a liquid crystal layer LQL. The substrate 10 and the substrate 20 are arranged in the Z direction which is the thickness direction of the display device DSP1. In other words, the substrate 10 and the substrate 20 face each other in the thickness direction (Z direction) of the display device DSP1. The substrate 10 has a front surface (main surface, surface) 10f facing the liquid crystal layer LQL (and the substrate 20). Further, the substrate 20 has a back surface (main surface, surface) 20b facing the front surface 10f of the substrate 10 (and the liquid crystal layer LQL). The substrate 10 is an array substrate in which a plurality of transistors (transistor elements) as switching elements (active elements) Tr (see FIG. 3) are arranged in an array. Also, the substrate 20 is a substrate provided on the side closer to the display surface. The substrate 20 can be restated as a counter substrate in the sense that it is a substrate arranged so as to face the array substrate.

The liquid crystal layer LQL containing liquid crystal LQ is located between the front surface 10f of the substrate 10 and the back surface 20b of the substrate 20. The liquid crystal layer LQL is an optical modulation element. The display device DSP1 has a function of modulating the light passing therethrough by controlling the state of the electric field formed around the liquid crystal layer LQL via the switching element described above. The display region DA on the substrate 10 and the substrate 20 is superimposed on the liquid crystal layer LQL as shown in FIG. 2.

Further, the substrate 10 and the substrate 20 are adhered to each other via a sealing portion (sealing material) SLM. As shown in FIG. 1, the sealing portion SLM is arranged in the peripheral region PFA so as to surround the display region DA. The liquid crystal layer LQL is present inside the sealing portion SLM as shown in FIG. 2. The sealing portion SLM serves as a seal for enclosing the liquid crystal between the substrate 10 and the substrate 20. Further, the sealing portion SLM serves as an adhesive material for adhering the substrate 10 and the substrate 20.

The side light source device 30 has a light source unit 31. The light source unit 31 is arranged at a position facing a side surface 20s1 of the substrate 20. As schematically shown by an alternate long and two short dashes line in FIG. 2, the light source light L1 emitted from the light source unit 31 propagates in a direction away from the side surface 20s1 while being reflected by the back surface 10b of the substrate 10 and the front surface 20f of the substrate 20. In the propagation path of the light source light L1, the back surface 10b of the substrate 10 and the front surface 20f of the substrate 20 are interfaces between a medium having a large refractive index and a medium having a small refractive index. Therefore, when the incident angle at which the light source light L1 is incident on the front surface 20f and the back surface 10b is larger than the critical angle, the light source light L1 is totally reflected on the front surface 20f and the back surface 10b.

The display device DSP1 controls the incident angle of the light source light L1 with respect to the liquid crystal LQ by controlling the orientation of the liquid crystal LQ in the propagation path of the light source light L1. When the incident angle of the light source light L1 with respect to the liquid crystal LQ is smaller than the critical angle, the light source light L1 is not totally reflected by the liquid crystal LQ and is emitted as the emitted light L2 from the front surface 20f to the outside of the display device DSP1. Further, the background light L3 incident from the back surface 10b passes through the substrate 10, the liquid crystal layer LQL, and the substrate 20 by controlling the orientation state of the liquid crystal LQ, and is emitted to the outside from the front surface 20f. The emitted light L2 and the background light L3 are visually recognized by the viewer located on the side of the front surface 20f. The viewer can recognize the emitted light L2 and the background light L3 in combination. The display device with which the viewer can recognize the displayed image and the background in superimposition as described above is referred to as a transparent display device.

<Configuration Example of Circuit>

Figure 3:
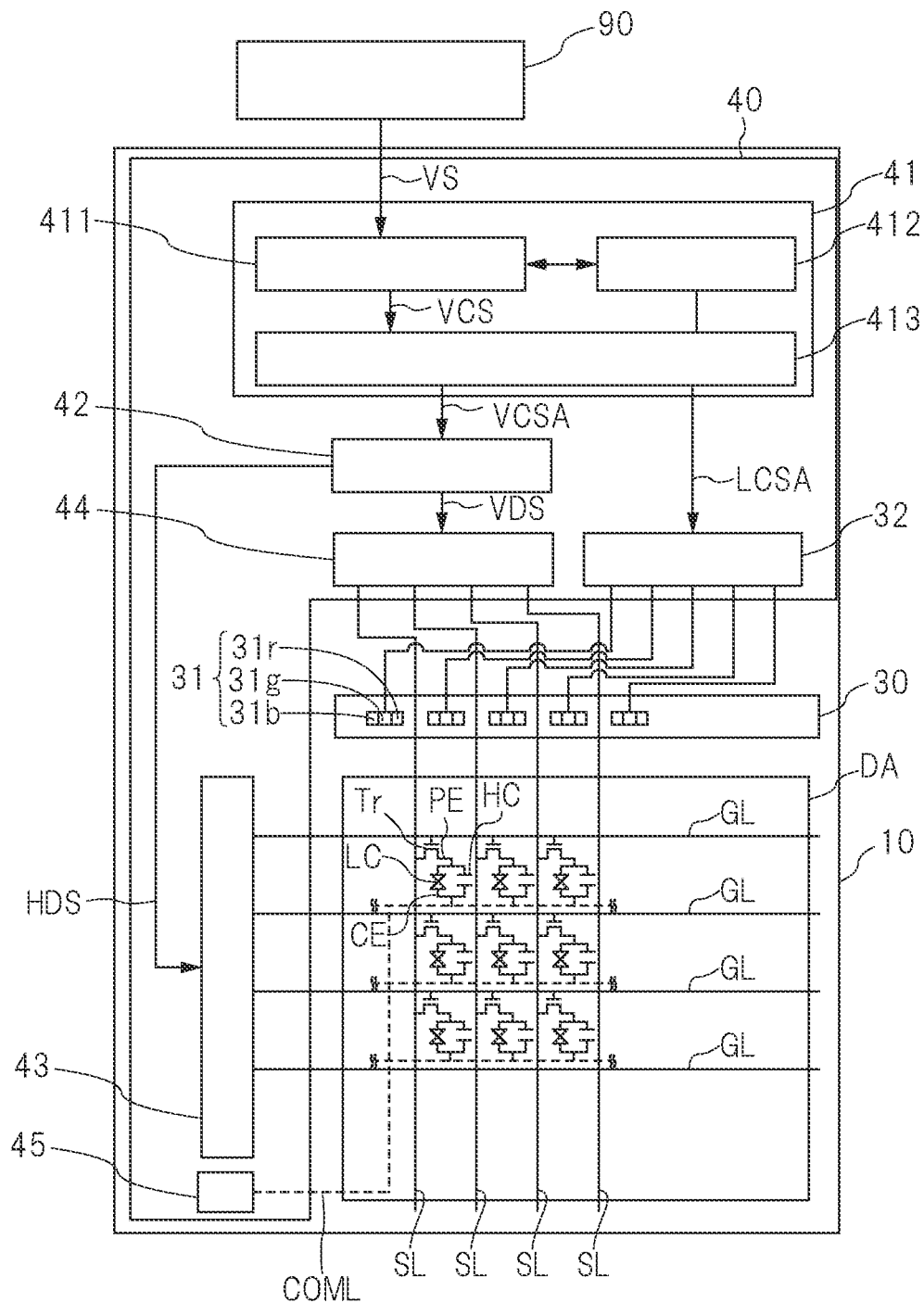
FIG. 3 is a circuit block diagram showing an example of a circuit provided in the display device in FIG. 1.

Next, a configuration example of the circuit provided in the display device shown in FIG. 1 will be described. FIG. 3 is a circuit block diagram showing an example of the circuit provided in the display device in FIG. 1. For example, the wiring path connected to a common electrode CE shown in FIG. 3 is formed on the substrate 20 shown in FIG. 2. In FIG. 3, the wiring formed on the substrate 20 is shown by a dotted line. In the example shown in FIG. 3, a light source control unit 32 is included in the drive circuit 40. As a modification, the light source control unit 32 may be provided separately from the drive circuit 40. The light source unit 31 and the light source control unit 32 are electrically connected via the wiring formed on the substrate 10.

In the example shown in FIG. 3, the drive circuit 40 includes a signal processing circuit 41, a pixel processing circuit 42, a gate drive circuit 43, a source drive circuit 44, and a common potential drive circuit 45. Further, the light source unit 31 includes, for example, a red light source unit 31r, a green light source unit 31g, and a blue light source unit 31b. As shown in FIG. 1, since the substrate 10 has a larger area than that of the substrate 20, each of the drive circuit 40 and the side light source device 30 is provided on the substrate 10.

The signal processing circuit 41 includes an input signal analysis unit (input signal analysis circuit) 411, a storage unit (storage circuit) 412, and a signal adjustment unit 413. The display device DSP1 includes a control unit 90 having a control circuit for controlling the image display, and the input signal VS is input to the input signal analysis unit 411 of the signal processing circuit 41 from the control unit 90 via a wiring path of a flexible wiring board or the like (not shown). The input signal analysis unit 411 performs analysis processing based on the input signal VS input from the outside, and generates the input signal VCS. The input signal VCS is, for example, a signal that determines what kind of gradation value is given to each pixel PIX (see FIG. 1) of the display panel P1 (see FIG. 1) based on the input signal VS.

The signal adjustment unit 413 generates the input signal VCSA from the input signal VCS input from the input signal analysis unit 411. The signal adjustment unit 413 sends the input signal VCSA to the pixel control circuit 42, and sends the light source control signal LCSA to the light source control unit 32. The light source control signal LCSA is, for example, a signal including the information of the amount of light of the light source unit 31 set in accordance with the input gradation value to the pixel PIX. For example, when a dark image is displayed, the amount of light of the light source unit 31 is set small. When a bright image is displayed, the amount of light of the light source unit 31 is set large.

The pixel control circuit 42 generates the horizontal drive signal HDS and the vertical drive signal VDS based on the input signal VCSA. For example, since the field sequential method is adopted for driving in the present embodiment, the horizontal drive signal HDS and the vertical drive signal VDS are generated for each color of light that the light source unit 31 can emit. The gate drive circuit 43 sequentially selects the gate line GL of the display panel P1 (see FIG. 1) within one vertical scanning period based on the horizontal drive signal HDS. The order of selection of the gate line GL is arbitrary. As shown in FIG. 1, a plurality of gate lines (signal wiring) GL extend in the X direction and are arranged along the Y direction.

The source drive circuit 44 supplies the gradation signal in accordance with the output gradation value of each pixel PIX (see FIG. 1) to each source line SL of the display panel P1 (see FIG. 1) within one horizontal scanning period based on the vertical drive signal VDS. As shown in FIG. 1, the plurality of source lines (signal wiring) SL extend in the Y direction and are arranged along the X direction. One pixel PIX is formed at each intersection of the gate line GL and the source line SL. A switching element Tr (see FIG. 3) is formed at each portion where the gate line GL and the source line SL intersect. The plurality of gate lines GL and the plurality of source lines SL shown in FIG. 1 and FIG. 3 correspond to a plurality of signal wirings for transmitting the drive signal for driving the liquid crystal LQ shown in FIG. 2.

For example, a thin film transistor is used as the switching element Tr shown in FIG. 3. The type of the thin film transistor is not particularly limited, and examples thereof include the following transistors. When classified by the position of the gate, a bottom gate transistor and a top gate transistor can be presented. Further, when classified by the number of gates, a single gate thin film transistor and a double gate thin film transistor can be presented. One of the source electrode and the drain electrode of the switching element Tr is connected to the source line SL, the gate electrode is connected to the gate line GL, and the other of the source electrode and the drain electrode is connected to one end of the capacitor of the polymer-dispersed liquid crystal LC. One end of the capacitor of the polymer-dispersed liquid crystal LC is connected to the switching element Tr via the pixel electrode PE, and the other end is connected to the common potential wiring COML via the common electrode CE. Further, a holding capacitor HC is generated between the pixel electrode PE and the holding capacitor electrode electrically connected to the common potential wiring COML. The common potential wiring COML is supplied from the common potential drive circuit 45.

<Structure of Peripheral Region>

Figure 4:
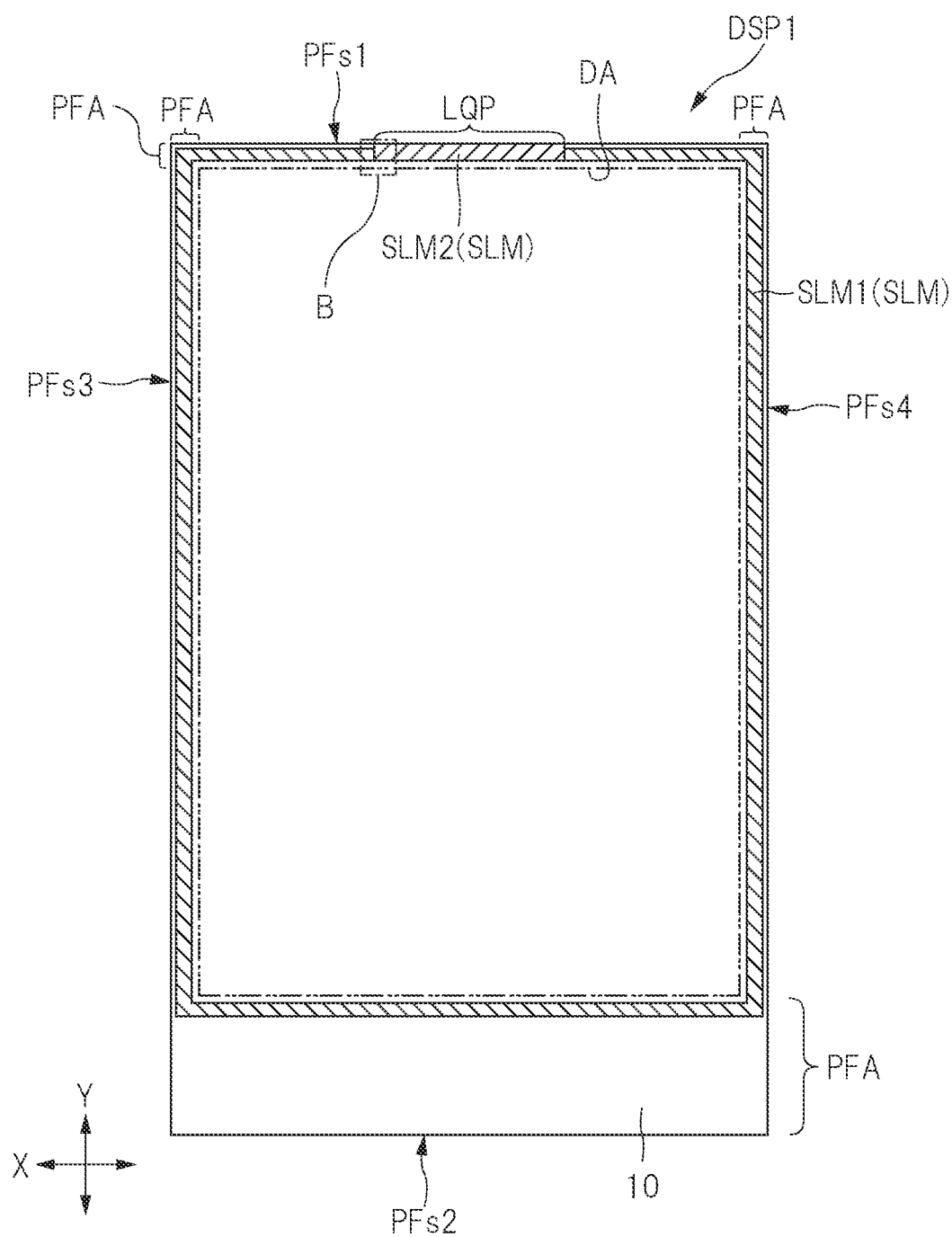
FIG. 4 is a plan view showing a planar positional relationship between the sealing portion shown in FIG. 2 and the display region shown in FIG. 1.
Figure 5:
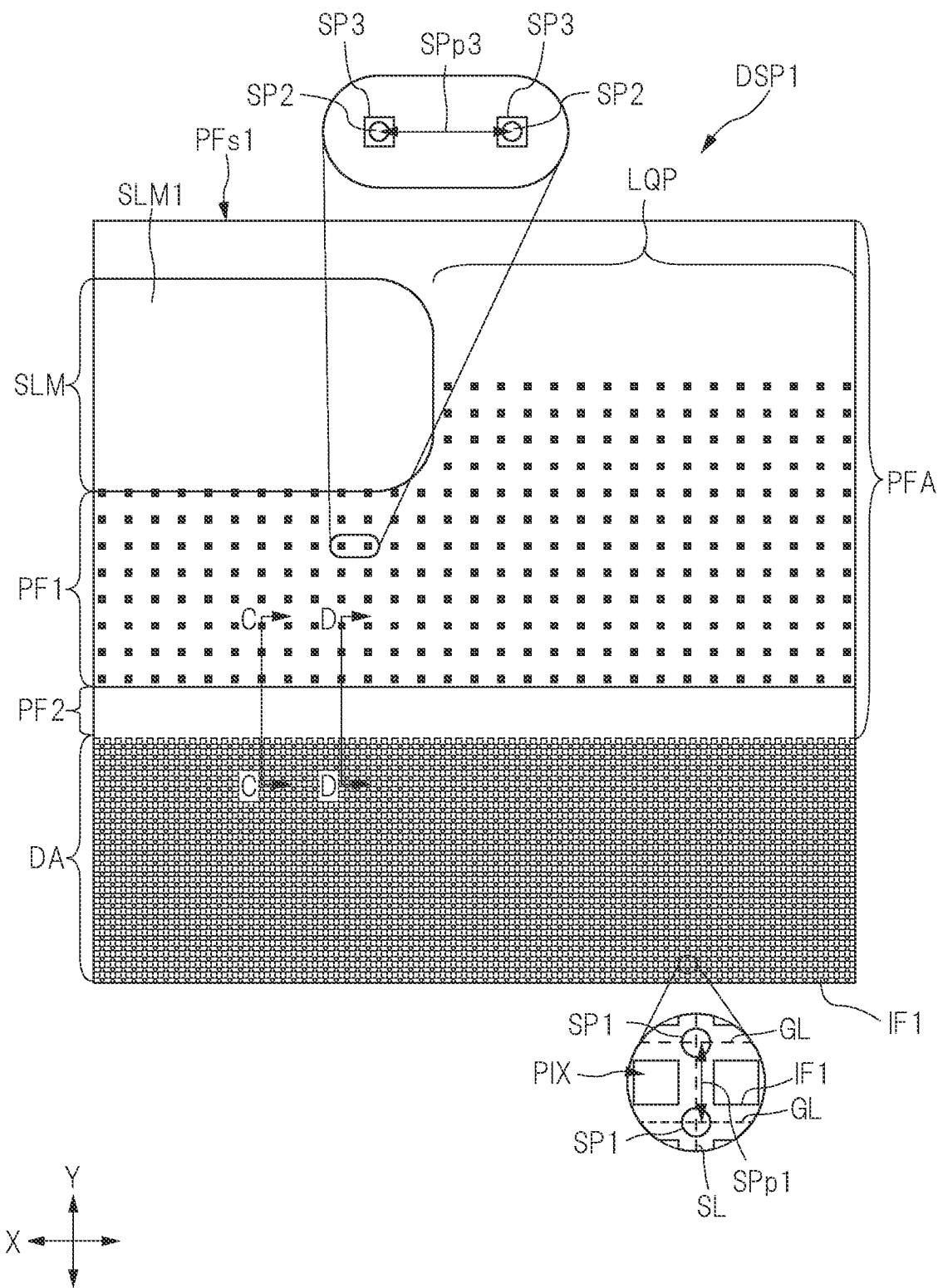
FIG. 5 is an enlarged plan view of a portion B in FIG. 4.

Next, a structure and an enclosing method for enclosing the liquid crystal layer LQL inside the sealing portion SLM shown in FIG. 2 will be described. FIG. 4 is a plan view showing a planar positional relationship between the sealing portion SLM shown in FIG. 2 and the display region shown in FIG. 1. FIG. 5 is an enlarged plan view of a portion B in FIG. 4. FIG. 6 is an enlarged cross-sectional view taken along the line C-C in FIG. 5. FIG. 7 is an enlarged cross-sectional view taken along the line D-D in FIG. 5. FIG. 4 and FIG. 5 are plan views of the display device shown in FIG. 1 as viewed from the side of the substrate 20, and the illustration of the substrate 20 is omitted. Although FIG. 4 is a plan view, hatching is applied to the sealing material SLM1 and the sealing material SLM2 in order to clarify the shapes of the sealing material SLM1 and the sealing material SLM2. In FIG. 4, a liquid crystal supply portion LQP of the display device DSP1 is sealed with the sealing material SLM2, but the sealing material SLM2 shown in FIG. 4 is removed in FIG. 5. In the manufacturing process before enclosing the liquid crystal LQ (see FIG. 2), the sealing material SLM2 is not yet formed as shown in FIG. 5, and the liquid crystal supply portion LQP serves as an opening that interconnects the space surrounded by the sealing portion SLM and the outside. Although the illustration thereof is omitted in FIG. 6 and FIG. 7, in the display region DA of the substrate 20, the common electrode CE shown in FIG. 3 and a light-shielding film provided in a grid pattern at a position overlapping the source line SL and the gate line GL in the display region DA are formed between the spacer member SP1 and the substrate 20 in some cases.

As shown in FIG. 4, the peripheral region PFA has a side PFs1, a side PFs2 on the opposite side of the side PFs1, a side PFs3 intersecting with the side PFs1, and a side PFs4 on the opposite side of the side PFs3. The sealing portion SLM is provided in the peripheral region PFA between the substrate 10 and the substrate 20 (see FIG. 2). The liquid crystal supply portion LQP is an opening provided at a part of the sealing portion SLM and formed so as to interconnect the outside of the sealing portion SLM and the display region DA. However, as described above, in the display device DSP1 of the finished product, the liquid crystal supply portion LQP is sealed with the sealing material SLM2.

The liquid crystal supply portion LQP is formed on at least one of the sides PFs1, PFs2, PFs3, and PFs4 of the peripheral region PFA. In the example shown in FIG. 4, the liquid crystal supply portion LQP is formed on the side PFs1 of the peripheral region PFA. In the manufacturing process of the display device DSP1, for example, the step of supplying the liquid crystal LQ shown in FIG. 2 to the inside of the sealing material SLM2 is performed as follows.

First, the substrate 10 and the substrate 20 shown in FIG. 1 are adhered and fixed via the sealing material SLM1 of the sealing portion SLM shown in FIG. 4. At this time, the sealing material SLM2 is not arranged at the liquid crystal supply portion LQP, and an opening is formed there. Next, the liquid crystal LQ (see FIG. 2) is brought into contact with the liquid crystal supply portion LQP in the state where the structure obtained by adhering the substrate 10 and the substrate 20 is arranged in a vacuum atmosphere (reduced pressure atmosphere lower than the atmospheric pressure). Then, when the environmental pressure is returned to atmospheric pressure in the state where the liquid crystal LQ is in contact with the liquid crystal supply portion LQP, the liquid crystal LQ is injected into the space surrounded by the sealing portion SLM by the pressure difference between the space surrounded by the sealing portion SLM and the outside and the capillary phenomenon. Thereafter, by sealing the opening of the liquid crystal supply portion LQP with the sealing material SLM2 shown in FIG. 4, the display panel P1 in which the liquid crystal LQ is enclosed between the substrate 10 and the substrate 20 is obtained as shown in FIG. 2.

The study by the inventors of the present application has revealed that the above-mentioned method of enclosing the liquid crystal LQ has the problem that affects the performance of the display device. For example, when the liquid crystal LQ (see FIG. 2) is supplied from the liquid crystal supply portion LQP shown in FIG. 4, if there is a member that obstructs the flow of the liquid crystal in the space surrounded by the sealing portion SLM, a large number of fine bubbles may be generated in the liquid crystal layer LQL (see FIG. 2). If these fine bubbles remain, they affect the display performance of the display device.

As shown in FIG. 6, the display device DSP1 includes an insulating film IF1 covering the source line SL (and the gate line GL shown in FIG. 5) between the substrate 10 and the substrate 20. The insulating film IF1 is, for example, an organic insulating film made of an organic insulating material such as an acrylic resin. The insulating film IF1 which is an organic insulating film can be formed to have a large thickness as compared with other insulating films made of an inorganic material (for example, an insulating film IF2 formed on the gate line GL and an insulating film IF3 formed on the source line SL shown in FIG. 6). In the display region DA shown in FIG. 5, the gate line GL and the source line SL are covered with the thick insulating film IF1. Consequently, it is possible to protect the gate line GL and the source line SL. Further, when the holding capacitor electrode electrically connected to the common potential wiring COML (see FIG. 3) is formed on the insulating film IF1, the influence of the common potential on the gate line GL and the source line SL can be reduced by arranging the thick insulating film IF1 between the holding capacitor electrode and the gate line GL and the source line SL.

In the case of the present embodiment, as shown in FIG. 5, the insulating film IF1 is formed in a grid pattern along the extending directions of the gate line GL and the source line SL. In this case, since the exposed area of the pixel PIX from the insulating film IF1 can be increased, the light transmission characteristics of the display device can be improved. As a modification, the pixel PIX may be covered with the insulating film IF1.

Further, as shown in FIG. 5 and FIG. 6, the display device DSP1 includes a plurality of spacer members SP1 arranged between the insulating film IF1 and the substrate 20 in the display region DA so as to maintain a gap between the substrate 10 and the substrate 20. Since the spacer member SP1 is arranged at a position overlapping the insulating film IF1, the gap between the substrate 10 and the substrate 20 can be maintained with high accuracy.

It is necessary to maintain the gap between the substrate 10 and the substrate 20 also in the peripheral region PFA shown in FIG. 5 and FIG. 6. Since the transparent display device of the present embodiment needs to transmit light also in the peripheral region PFA, a structure in which the insulating film IF1 is arranged also in the peripheral region PFA as in the display region DA is conceivable from the viewpoint of making the display region DA and the peripheral region PFA have similar light transmission characteristics. However, the study by the inventors of the present application has revealed that, when the insulating film IF1 is arranged in the peripheral region PFA, in particular, in the vicinity of the liquid crystal supply portion LQP, the insulating film IF1 becomes an obstacle that obstructs the flow of the liquid crystal LQ (see FIG. 2) and the above-mentioned fine bubbles are generated.

Therefore, in the present embodiment, the structure shown in FIG. 5 and FIG. 6 has been found as a structure capable of suppressing the generation of bubbles and maintaining the gap between the substrate 10 and the substrate 20 in the peripheral region PFA. Namely, the peripheral region PFA includes a peripheral region PF1 located between the display region DA and the sealing portion SLM (see FIG. 5), and the insulating film IF1 is removed in the peripheral region PF1. In the peripheral region PF1, a plurality of spacer members SP2 made of the same material as that of the plurality of spacer members SP1 and a plurality of spacer members SP3 formed between the plurality of spacer members SP2 and the substrate 10 and supporting the plurality of spacer members SP2 are provided. The plurality of spacer members SP3 are separated from each other.

The peripheral region PF1 spreads not only between the liquid crystal supply portion LQP and the display region DA but also between the sealing material SLM1 and the display region DA in the X direction along the side PFs1 (see FIG. 4). More specifically, the peripheral region PF1 from which the insulating film IF1 has been removed continuously spreads in the X direction from the boundary with the sealing portion SLM along the side PFs3 shown in FIG. 4 to the boundary with the sealing portion SLM along the side PFs3.

In the case of the display device DSP1, the wider cross-sectional area of the injection path of liquid crystal can be secured as compared with the case in which the insulating film IF1 is arranged in the peripheral region PF1 as in the display region DA, so that the flow of the liquid crystal is less likely to be obstructed. As a result, the generation of the above-mentioned bubbles can be suppressed. Also, as shown in FIG. 6, even when the insulating film IF1 is not formed in the peripheral region PF1, since the spacer members SP2 and the spacer members SP3 are arranged so as to overlap between the substrate 10 and the substrate 20, the gap between the substrate 10 and the substrate 20 can be maintained.

In the case of the present embodiment, the plurality of spacer members SP1 and the plurality of spacer members SP2 are formed on the side closer to the substrate 20, and the plurality of spacer members SP3 are formed on the side closer to the substrate 10. The plurality of spacer members SP2 and the plurality of spacer members SP3 are formed at positions where they face each other when the substrate 10 and the substrate 20 are overlapped with each other. In this case, since it is not necessary to make the thickness (height in the Z direction) of the plurality of spacer members SP2 and the plurality of spacer members SP3 extremely large, each of the plurality of spacer members SP2 and the plurality of spacer members SP3 can be easily formed.

Each of the spacer members SP1, SP2, and SP3 may be made of different materials and formed to have different thicknesses. However, from the viewpoint of improving the work efficiency of the process of forming the spacer members SP2 and SP3, the following is preferable. That is, it is preferable that the plurality of spacer members SP2 are made of the same material as that of the plurality of spacer members SP1 and have the same thickness (height in the Z direction) as that of the plurality of spacer members SP1. As a result, the spacer members SP1 and SP2 can be formed at one time in the step of forming the spacer member SP1, so that it is possible to prevent the addition of a manufacturing process for forming the spacer member SP2.

Further, it is preferable that each of the plurality of spacer members SP3 has the same thickness as that of the insulating film IF1 in the display region DA and is made of the same material as that of the insulating film IF1. When the insulating film IF1 and the spacer member SP3 are made of the same material, for example, the insulating film IF1 and the plurality of spacer members SP3 having the shapes shown in FIG. 5 can be formed at one time by forming the insulating film IF1 as a flat film that continuously spreads from the display region DA to the peripheral region PFA, and then selectively removing a part of the insulating film IF1 by etching process.

By making the spacer member SP2 and the spacer member SP1 have the same thickness and making the spacer member SP3 and the insulating film IF1 have the same thickness, the gap between the substrate 10 and the substrate 20 in the display region DA can be made the same as the gap between the substrate 10 and the substrate 20 in peripheral region PF1. By maintaining the gap between the substrate 10 and the substrate 20 in the peripheral region PF1 in this way, it is possible to prevent the flow path from becoming narrow when injecting the liquid crystal LQ (see FIG. 2).

By the way, in the example shown in FIG. 5 to FIG. 7, the display device DSP1 includes a peripheral region PF2 in which a circuit SLC connected to the plurality of source lines (signal wiring) SL is arranged and the insulating film IF1 covering the circuit SLC is formed. The circuit SLC is, for example, a pixel electrode selection circuit, a test circuit, a protection circuit, or the like. When the circuit SLC connected to the plurality of source lines SL is arranged in the peripheral region PFA as described above, it is preferable that the insulating film IF1 covering the circuit SLC is provided from the viewpoint of protecting the circuit SLC. Although FIG. 6 and FIG. 7 show the circuit SLC connected to the source line SL as an example, the gate drive circuit 43 connected to the gate line GL shown in FIG. 3 may be arranged on either or both of the side PFs3 and the side PFs4 shown in FIG. 4. In this case, as in the structure shown in FIG. 6 and FIG. 7, the gate drive circuit 43 (see FIG. 3) arranged in the peripheral region PFA is preferably covered with the insulating film IF1.

Further, since the insulating film IF1 is formed in the peripheral region PF2, the flow path of the liquid crystal is narrowed in the peripheral region PF2. Therefore, from the viewpoint of widening the flow path of the liquid crystal as much as possible, it is preferable that the plurality of spacer members SP1 and the plurality of spacer members SP2 are not formed in the peripheral region PF2 as in the example shown in FIG. 5 to FIG. 7. It is preferable that the width of the insulating film IF1 in the Y direction is narrowed as much as possible within a range in which the circuit SLC is not exposed. Therefore, even if the plurality of spacer members SP1 and the plurality of spacer members SP2 are not formed in the peripheral region PF2, the gap between the substrate 10 and the substrate 20 can be maintained if the plurality of spacer members SP2 and SP3 are formed in the peripheral region PF1. However, as a modification, the spacer members SP2 may be formed also in the peripheral region PF2 as well as the peripheral region PF1.

Further, the following structure is preferable from the viewpoint of widening the flow path of the liquid crystal in the peripheral region PF1. As shown in FIG. 5 and FIG. 6, the array pitch SPp3 of the spacer members SP3 adjacent to each other among the plurality of spacer members SP3 is wider than the array pitch SPp1 of the spacer members SP1 adjacent to each other among the plurality of spacer members SP1. The array pitch SPp3 is defined as the distance between the centers of the spacer members SP3 adjacent to each other in a plan view, and the array pitch SPp1 is defined as the distance between the centers of the spacer members SP1 adjacent to each other in a plan view. Each of the spacer members SP1, SP2, and SP3 is regularly arranged. Therefore, the array pitch SPp1 shown in FIG. 5 and the array pitch SPp1 shown in FIG. 6 have the same value. Similarly, the array pitch SPp3 shown in FIG. 5 and the array pitch SPp3 shown in FIG. 6 have the same value.

In the case of the example shown in FIG. 5 and FIG. 6, the array pitch SPp1 is 0.2 mm, and the array pitch SPp3 is 0.5 mm. However, the values of the array pitch SPp1 and the array pitch SPp3 can be changed in accordance with the specifications of the display device, and are not limited to the above-mentioned values. In particular, as shown in FIG. 5, since the spacer members SP1 are arranged at the positions where the insulating film IF1 formed in a grid pattern intersects, the value of the array pitch SPp1 is changed in accordance with the size of the pixel PIX.

A person having ordinary skill in the art can make various modifications and corrections within a scope of the idea of the present invention, and it is interpreted that the modifications and corrections also belong to the scope of the present invention. For example, the embodiments obtained by performing addition or elimination of components or design change or the embodiments obtained by performing addition or reduction of process or condition change to the embodiments described above by a person having an ordinary skill in the art are also included in the scope of the present invention as long as they include the gist of the present invention.

The present invention can be applied to a display device and an electronic equipment in which the display device is incorporated.

What is claimed is:
1. A display device comprising:
a display region;
a peripheral region around the display region;
a first substrate;
a second substrate facing the first substrate;

a liquid crystal layer arranged between the first substrate and the second substrate and containing liquid crystal;
a plurality of signal wirings formed on the first substrate and transmitting a drive signal for driving the liquid crystal;
a first insulating film arranged between the first substrate and the second substrate and covering the plurality of signal wirings;
a plurality of first spacer members arranged between the first insulating film and the second substrate in the display region and maintaining a gap between the first substrate and the second substrate;
a sealing portion provided in the peripheral region between the first substrate and the second substrate to seal the liquid crystal layer; and
a liquid crystal supply portion provided at a part of the sealing portion and interconnecting an outside of the sealing portion and the display region,
wherein, in a plan view seen from a side of the second substrate, the peripheral region has a first side, a second side on an opposite side of the first side, a third side intersecting with the first side, and a fourth side on an opposite side of the third side,
wherein the liquid crystal supply portion is provided along the first side of the peripheral region,
wherein the peripheral region includes a first peripheral region located between the display region and the sealing portion,
wherein the first insulating film is removed in the first peripheral region,
wherein, in the first peripheral region, a plurality of second spacer members arranged between the first substrate and the second substrate and a plurality of third spacer members formed between the plurality of second spacer members and the first substrate to support the plurality of second spacer members are provided, and
wherein the first insulating film is formed in a grid pattern in the display region.

2. The display device according to claim 1,
wherein the plurality of second spacer members have the same thickness as that of the plurality of first spacer members and are made of the same material as that of the plurality of first spacer members, and
wherein each of the plurality third spacer members has the same thickness as that of the first insulating film and is made of the same material as that of the first insulating film.

3. The display device according to claim 1,
wherein a second peripheral region is disposed between the first peripheral region and the display region, and
wherein in the second peripheral region, a first circuit connected to the plurality of signal wirings and the first insulating film covering the first circuit are formed.

4. The display device according to claim 3,
wherein the plurality of first spacer members and the plurality of second spacer members are not formed in the second peripheral region.

5. The display device according to claim 1,
wherein an array pitch of the third spacer members adjacent to each other among the plurality of third spacer members is wider than an array pitch of the first spacer members adjacent to each other among the plurality of first spacer members.

6. The display device according to claim 1, further comprising a light source device,
wherein the second substrate has a first side surface and a second side surface opposed to the first side surface,
wherein the light source device applies a light from a side of the first side surface of the second substrate to a side of the second side surface of the second substrate, and
wherein a background on a first substrate side can be visually recognized when the display device is viewed from a second substrate side.

7. The display device according to claim 6,
wherein the plurality of second spacer members have the same thickness as that of the plurality of first spacer members and are made of the same material as that of the plurality of first spacer members, and
wherein each of the plurality third spacer members has the same thickness as that of the first insulating film and is made of the same material as that of the first insulating film.

8. A display device comprising:
a display region;
a peripheral region around the display region;
a first substrate;
a second substrate facing the first substrate;
a liquid crystal layer arranged between the first substrate and the second substrate and containing liquid crystal;
a plurality of signal wirings formed on the first substrate and transmitting a drive signal for driving the liquid crystal;
a first insulating film arranged between the first substrate and the second substrate and covering the plurality of signal wirings;
a plurality of first spacer members arranged between the first insulating film and the second substrate in the display region and maintaining a gap between the first substrate and the second substrate;
a sealing portion provided in the peripheral region between the first substrate and the second substrate to seal the liquid crystal layer; and
a liquid crystal supply portion provided at a part of the sealing portion and interconnecting an outside of the sealing portion and the display region,
wherein, in a plan view seen from a side of the second substrate, the peripheral region has a first side, a second side on an opposite side of the first side, a third side intersecting with the first side, and a fourth side on an opposite side of the third side,
wherein the liquid crystal supply portion is provided along the first side of the peripheral region,
wherein the peripheral region includes a first peripheral region located between the display region and the sealing portion, wherein the first insulating film is removed in the first peripheral region,
wherein, in the first peripheral region, a plurality of second spacer members arranged between the first substrate and the second substrate and a plurality of third spacer members formed between the plurality of second spacer members and the first substrate to support the plurality of second spacer members are provided,
wherein a second peripheral region is disposed between the first peripheral region and the display region, and
wherein in the second peripheral region, a first circuit connected to the plurality of signal wirings and the first insulating film covering the first circuit are formed.

9. The display device according to claim 8,
wherein the plurality of second spacer members have the same thickness as that of the plurality of first spacer members and are made of the same material as that of the plurality of first spacer members, and wherein each of the plurality third spacer members has the same thickness as that of the first insulating film and is made of the same material as that of the first insulating film.

10. The display device according to claim 8, wherein the plurality of first spacer members and the plurality of second spacer members are not formed in the second peripheral region.

11. The display device according to claim 8, wherein an array pitch of the third spacer members adjacent to each other among the plurality of third spacer members is wider than an array pitch of the first spacer members adjacent to each other among the plurality of first spacer members.

12. The display device according to claim 8, further comprising a light source device, wherein the second substrate has a first side surface and a second side surface opposed to the first side surface, wherein the light source device applies a light from a side of the first side surface of the second substrate to a side of the second side surface of the second substrate, and wherein a background on a first substrate side can be visually recognized when the display device is viewed from a second substrate side.

13. A display device comprising:

a display region;

a peripheral region around the display region;

a first substrate;

a second substrate facing the first substrate;

a liquid crystal layer arranged between the first substrate and the second substrate and containing liquid crystal;

a plurality of signal wirings formed on the first substrate and transmitting a drive signal for driving the liquid crystal;

a first insulating film arranged between the first substrate and the second substrate and covering the plurality of signal wirings;

a plurality of first spacer members arranged between the first insulating film and the second substrate in the display region and maintaining a gap between the first substrate and the second substrate;

a sealing portion provided in the peripheral region between the first substrate and the second substrate to seal the liquid crystal layer; and a liquid crystal supply portion provided at a part of the sealing portion and interconnecting an outside of the sealing portion and the display region, wherein, in a plan view seen from a side of the second substrate, the peripheral region has a first side, a second side on an opposite side of the first side, a third side intersecting with the first side, and a fourth side on an opposite side of the third side, wherein the liquid crystal supply portion is provided along the first side of the peripheral region, wherein the peripheral region includes a first peripheral region located between the display region and the sealing portion, wherein the first insulating film is removed in the first peripheral region, wherein, in the first peripheral region, a plurality of second spacer members arranged between the first substrate and the second substrate and a plurality of third spacer members formed between the plurality of second spacer members and the first substrate to support the plurality of second spacer members are provided, and wherein an array pitch of the third spacer members adjacent to each other among the plurality of third spacer members is wider than an array pitch of the first spacer members adjacent to each other among the plurality of first spacer members.

14. The display device according to claim 13, wherein the plurality of second spacer members have the same thickness as that of the plurality of first spacer members and are made of the same material as that of the plurality of first spacer members, and wherein each of the plurality third spacer members has the same thickness as that of the first insulating film and is made of the same material as that of the first insulating film.

15. The display device according to claim 13, further comprising a light source device, wherein the second substrate has a first side surface and a second side surface opposed to the first side surface, wherein the light source device applies a light from a side of the first side surface of the second substrate to a side of the second side surface of the second substrate, and wherein a background on a first substrate side can be visually recognized when the display device is viewed from a second substrate side.

* * * * *